Nov. 15, 1949          E. ANDERSON            2,488,256
                     BALL BEARING JACK SCREW
Filed March 7, 1944                         2 Sheets-Sheet 1
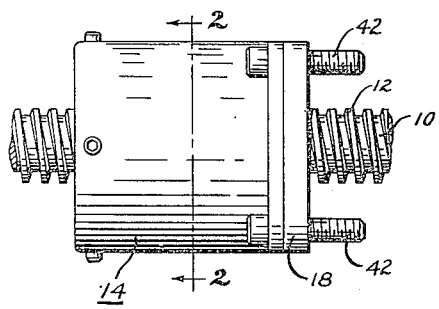
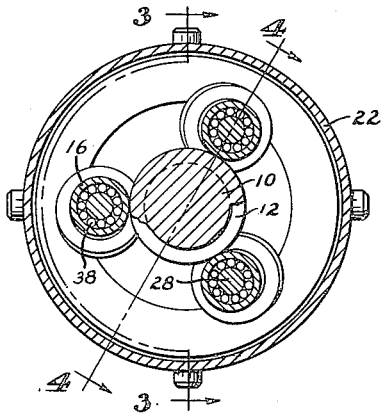
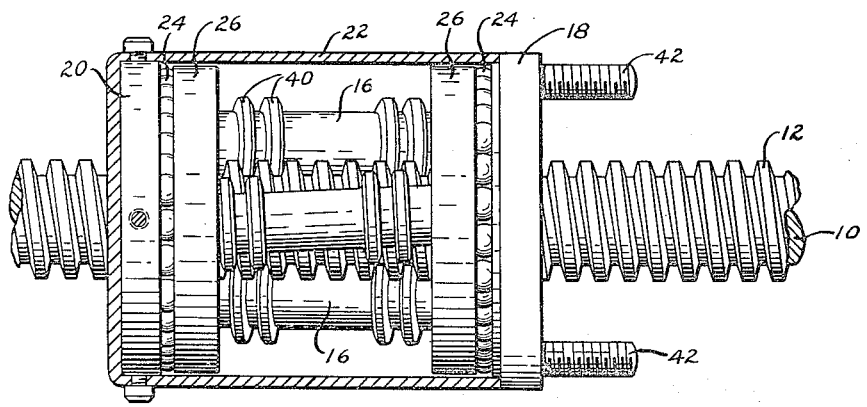
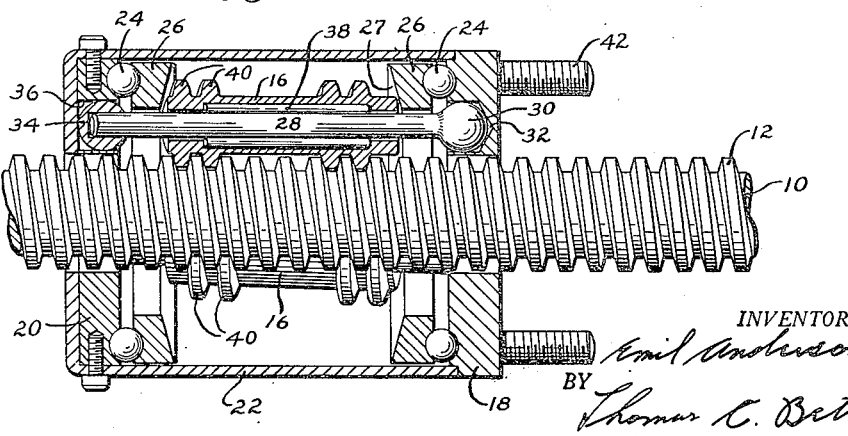

Patented Nov. 15, 1949

2,488,256

UNITED STATES PATENT OFFICE 2,488,256

BALL BEARING JACK SCREW

Emil Anderson, Briarcliff Manor, N. Y., assignor to Electrolux Corporation, Old Greenwich, Conn., a corporation of Delaware Application March 7, 1944, Serial No. 525,390

7 Claims. (Cl. 74—424.8)

My invention relates to improvements in screw jacks or the like.

Ordinary screw jacks in effect are merely a nut and bolt assembly, wherein the face of the thread on the bolt slides over the face on the thread in the nut. This results in a tremendous amount of friction when the device is subjected to an axial load and, even with lubrication, the maximum efficiency obtainable is in the neighborhood of fifteen per cent. Various attempts have been made to increase the efficiency by providing rolling contact between the screw and the bolt. However, this has involved either excessively complicated devices, or devices not having sufficient strength to withstand the large loads usually encountered.

Among the objects of my invention are to provide a highly efficient screw jack which is relatively simple in construction and which is able to withstand large loads.

Further objects and advantages of my invention will be apparent from the following description considered in connection with the accompanying drawings, which form a part of this specification and of which;

Fig. 1 is an elevational view of a device in accordance with my invention;

Fig. 2 is a cross-sectional view on an enlarged scale taken on the line 2—2 of Fig. 1;

Fig. 3 is a cross-sectional view taken on the line 3—3 of Fig. 2;

Fig. 4 is a cross-sectional view taken on the line 4—4 of Fig. 2;

Figure 5:
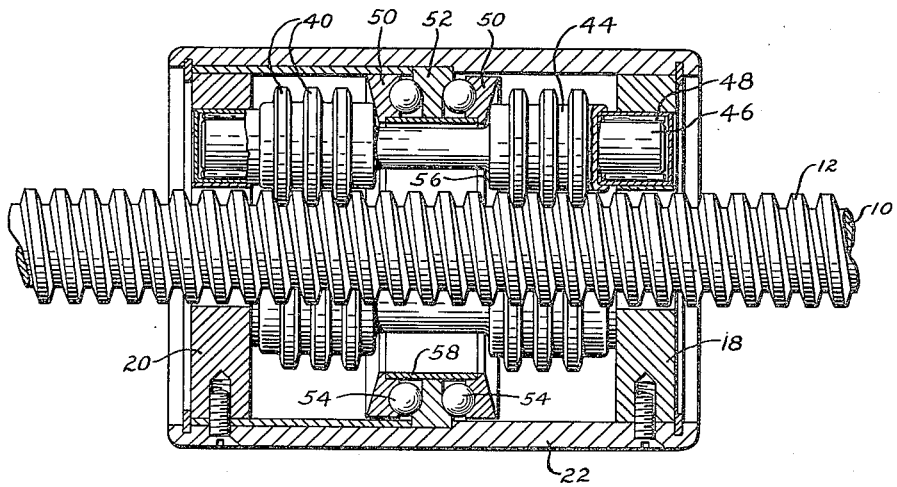
Fig. 5 is a view similar to Fig. 4, but showing another embodiment of my invention.

Referring more particularly to Figs. 1 to 4, reference character 10 designates a screw having a thread 12 of suitable pitch. The screw extends through what may be termed a nut structure 14, which includes a retainer having a plurality of rollers 16. The retainer comprises end plates 18 and 20 which are secured in fixed relationship to each other by means of a cylindrical housing 22.

The end plates 18 and 20 each have formed therein a race for a plurality of balls 24 which also cooperate with races formed in thrust rings 26. The rollers 16 are located between the two thrust rings 26 and are rotatably mounted on shafts 28 which extend therethrough. One end of each shaft is formed as a portion of a ball or sphere 30 which is received in a socket 32 in the end plate 18. The other end of each shaft is secured within a ball 34 which is received in a socket 36 in the end plate 20. If desired, the ball 30 could be separate from the shaft 28, but obviously both balls could not be integral with the shaft as this would make it impossible to insert the latter through the roller 16. A suitable needle bearing 38 is provided between the shaft 28 and the roller 16.

Each roller is provided with the plurality of annular ribs or lands 40, separated by grooves, located adjacent to each end of the roller, there being no lands formed on the central portion of the latter. The dimensions of the lands are such that they mesh with the thread 12 on the screw. Preferably the thread 12 is an Acme thread, that is, one having straight faces, while the lands 40 have a gear tooth profile having convexly curved faces. This provides point contact between the two, which results in pure rolling, instead of a combination of rolling and sliding friction.

As shown more clearly in Fig. 3, the shafts 28 and the rollers 16 are not parallel to the screw 10, but are disposed at a suitable angle with respect to the screw, such that the lands 40 are substantially parallel to the thread 12 at the points of contact between the lands and the thread. This results in a larger area of contact than would be the case if the rollers were parallel to the screw. However, in order that the lands at the ends of the rollers shall properly contact the thread, it is necessary that there be no lands on the central portions of the rollers. If the rollers were provided with lands throughout their length, the lands at the center only would contact the thread and would prevent the rollers from being set close enough to the screw to permit the lands at the ends to engage the thread. This would result in a structure having about one half the contact area of that shown.

The ball and socket arrangement for mounting the shafts 28 in the end plates 18 and 20 is employed in order to avoid the necessity of drilling holes at an angle in these plates. While the latter could, of course, be done, it would be essential that all the holes be drilled at exactly the proper angle, which is somewhat difficult from a manufacturing standpoint.

It will be noted that the lands on the different rollers are located in different positions axially because of the lead of the thread on the screw. Assuming the rollers to be equally spaced about the screw, the lands on adjacent rollers should be displaced axially by an amount equal to the lead of the screw 12 divided by the number of rollers.

It will be assumed that the nut structure 14 is fixed to a suitable support by means of the bolts 42 and that the screw 10 is rotated and subjected to an axial load. The rotation will cause the thread to advance through the grooves formed between the lands on the rollers. However, the thread does not slide over the rollers, but causes them to rotate about the shafts 28, and due to the curved profile of the lands 40, there is only rolling friction between the screw and the rollers. A combined radial and axial load is thus applied to the rollers and a portion of the radial load is transmitted through the needle bearings 38 to the shafts 28 and thence to the end plates 18 and 20. The axial or thrust load imposed on the rollers, together with the remainder of the radial load, is transmitted to one or the other of the thrust rings 26, depending upon the direction of the thrust load applied to the screw 10. The face 27 of each thrust ring is dished so as to be substantially normal to the vectors representing the resultants of the radial and axial loads imposed on the rollers, whereby most of the combined load is transmitted through the thrust ring and balls 24, thus making possible the use of relatively small needle bearings. On the other hand, the thrust rings and balls 24 may be made as heavy as desired, thus enabling the device to withstand very large loads. As the rollers are rotated by turning of the screw, they cause the thrust ring which is under load to rotate, which it may do with a minimum of frictional resistance by virtue of the ball bearings 24.

Thus, rotation of the screw 10 causes the latter to advance axially without overcoming any sliding friction, inasmuch as the screw rolls on the rollers and the latter roll on one or the other of the thrust ring 26, which in turn rolls on its ball bearing 24. This results in a screw jack having exceedingly high mechanical efficiency. In fact, the efficiency is so high that the device is reversible, that is to say, an axial load applied to the screw 10 will cause the latter to rotate within the nut structure 14. As is well known, the efficiency of an ordinary screw jack of the nut and bolt type is so low that an axial load applied to the bolt will strip the threads before it will cause rotation of the bolt.

In the embodiment illustrated in Fig. 5, the rollers 44 are formed with integral shaft extensions 46 which are mounted in needle bearings 48 in the end plates 18 and 20, thus eliminating the necessity of separate shafts for the rollers.

Moreover, in this embodiment, thrust rings 50 are provided at the central portions of the rollers. The casing 22 of the nut structure carries an annular ring 52 which is formed with a bearing race on either side thereof. Balls 54 cooperate with these races and with races formed in the thrust rings 50. These thrust rings cooperate with radial surfaces 56 formed on the rollers at the opposite ends of the central portions.

A cylindrical sleeve 58 extends between the inner peripheries of the thrust rings 50 and serves to substantially prevent the introduction into the ball bearings of dirt which may be carried into the nut structure by the advancing screw.

The profiles of the thread 12 and the lands 40 are preferably the same as those shown in the first embodiment, whereby sliding friction between the screw and the roller is eliminated, there being only rolling friction.

The operation of this embodiment is similar to that previously described. The thrust load imposed on the rollers by the screw, as well as a major portion of the radial load, is transmitted to the casing 22 through the thrust rings 50, ball bearings 54 and the annular ring 52, while the remainder of the radial load is carried by the needle bearings 48.

Figure 7:
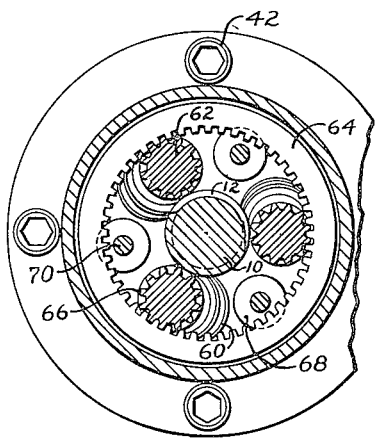
Fig. 7 is a cross-sectional view taken on the line 7—7 of Fig. 6.
Figure 6:
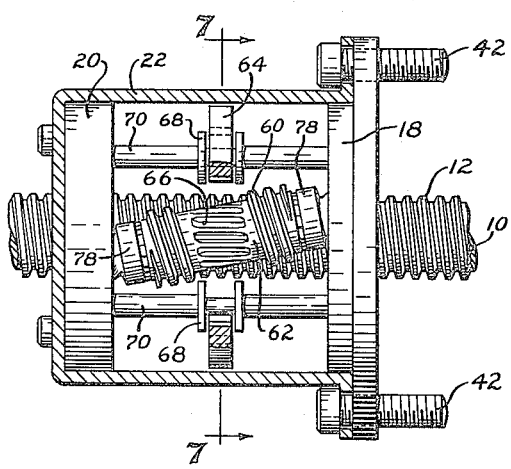
Fig. 6 is a view similar to Fig. 3, but showing a still further embodiment.
Figure 8:
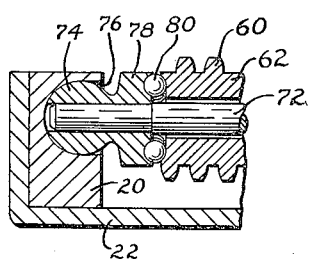
Fig. 8 is a detailed view of a portion of the device shown in Figs. 6 and 7.

In the embodiment illustrated in Figs. 6 through 8, the lands 60 on the rollers 62 are in the form of threads which have the same pitch as the thread 12 on the screw 10. As in the previous embodiments, the screw has an Acme thread, while the lands 60 have a tooth profile with curved faces. Obviously, this could be reversed, but as an Acme thread is easier to cut it usually is preferable to have it on the screw, which is much longer than the rollers. The rollers are disposed at an angle with respect to the screw such that the threads 60 and 12 are parallel at their points of contact, such angle being substantially equal to the sum of the pitch angles of the two threads.

Likewise, the axial distance through which the screw will advance for each revolution will be equal to the sum of the leads of the threads on the screw and on the rollers, assuming no slippage between the screw and the rollers. In practice, there is apt to be a slight amount of slippage, but for many applications it is not important that the screw advance a certain definite distance when rotated through a certain number of revolutions.

However, if the slippage between the screw and the different rollers were unequal, binding would result, inasmuch as the screw would tend to advance further with respect to one roller than it would with respect to the others. In order to eliminate any possibility of such binding, the several rollers are geared together by means of an internal gear 64 engaging teeth 66 cut in the central portion of each roller. The gear 64 floats on the teeth 66 and is retained against axial displacement by means of collars 68 carried by pins 70 extending between the end plates of the nut structure. The teeth 66 are cut at an angle with respect to the axis of the roller in order that they will be parallel to the teeth on the gear 64, inasmuch as the rollers are mounted obliquely with respect to the gear.

In this embodiment the rollers are mounted by shafts 72 which in turn are supported by balls 74 received in sockets 76 formed in the end plates. The balls 74 are integral with cylindrical portions 78 formed with races which cooperate with balls 80 engaging races formed in the ends of the rollers 62. These ball bearings are designed to carry both the radial and thrust loads imposed on the rollers.

It is believed that the operation of this embodiment will be apparent from the foregoing description. Rotation of the screw 10 causes the rollers 60 to rotate, and all of the rollers are caused to rotate at the same speed by virtue of the gear 64. Consequently, if any slippage occurs between the screws and the rollers, it will be equal for all of the rollers, thus preventing binding. As above stated, the advance of the screw will be equal to the sum of the leads of the threads on the rollers and on the screw.

While I have shown and described several embodiments of my invention, it is to be understood that this has been done for purposes of illustration only, and that the scope of my invention is not to be limited thereby, but is to be determined from the appended claims.

What I claim is:

1. In a screw jack, a threaded screw, a retaining member, a plurality of rollers having lands and grooves adjacent to opposite ends thereof cooperating with the thread on said screw, the central portion of each roller being free from engagement with said thread, and means for rotatably mounting said rollers in said retaining means with the axis of each roller disposed at an angle to the axis of said screw substantially equal to the pitch angle of the thread on said screw.

2. In a screw jack, a threaded screw, a retaining member, a plurality of hollow rollers having lands and grooves adjacent to opposite ends on the exterior surfaces thereof cooperating with the thread on said screw, the central portion of each roller being free from engagement with said thread, shafts supported at opposite ends by said retaining member, each shaft extending through one of said hollow rollers, and anti-friction bearing means for rotatably mounting said rollers on said shafts.

3. In a screw jack, a threaded screw, a retaining member, a plurality of hollow rollers having lands and grooves adjacent to opposite ends on the exterior surfaces thereof cooperating with the thread on said screw, the central portion of each roller being free from engagement with said thread, a plurality of shafts, ball and socket structure for supporting said shafts in said retaining member at an angle to said screw, each shaft extending through one of said rollers, and anti-friction bearing means for rotatably mounting said rollers on said shafts.

4. In a screw jack, a threaded screw, a retaining member, a plurality of rollers having spiral lands and grooves adjacent to opposite ends thereof cooperating with the thread on said screw, the central portion of each roller being free from engagement with said thread, thrust transmitting means for rotatably mounting said rollers in said retaining member, gear teeth formed at the central portion of each roller, and an internal gear meshing with said gear teeth.

5. In a screw jack, a threaded screw, a retaining member, a plurality of rollers having spiral lands and grooves adjacent to opposite ends thereof cooperating with the thread on said screw, the central portion of each roller being free from engagement with said thread, thrust transmitting means for rotatably mounting said rollers in said retaining member at an angle to said screw such that said lands are substantially parallel to said thread where the lands are in contact with the thread, gear teeth formed at the central portion of each roller, and an internal gear meshing with said gear teeth.

6. In a screw jack, a threaded screw, a retaining member, a plurality of rollers axially inclined with respect to the axis of said screw and having lands and grooves cooperating with the thread on said screw, a thrust ring rotatably mounted in said retaining member, said ring having a dished thrust face in rolling contact with radial surfaces on said rollers, the angle of said dished face being such that it is substantially normal to the vector representing the resultant of the radial and axial loads applied to said rollers.

7. In a screw jack, a threaded screw, a retaining member, a plurality of rollers mounted within said retaining member and disposed with their axes at an angle with respect to the axis of the threaded screw and each having lands and grooves adjacent its opposite ends and engaging the threads of said screw, the central portion of each roller being free from engagement with said threads, and thrust transmitting means for rotatably mounting said rollers in said retaining member.

EMIL ANDERSON.

REFERENCES CITED

The following references are of record in the file of this patent:

UNITED STATES PATENTS

| Number | Name | Date |
|---|---|---|
| 365,993 | Hardcastle | July 5, 1887 |
| 511,679 | Buckley | Dec. 26, 1893 |
| 522,249 | Buckley | July 3, 1894 |
| 747,463 | Moore | Dec. 22, 1903 |
| 1,622,987 | Austin | Mar. 29, 1927 |
| 1,918,587 | Bryant | July 18, 1933 |
| 2,131,151 | Smith | Sept. 27, 1938 |
| 2,330,082 | Side et al. | Sept. 21, 1943 |

FOREIGN PATENTS

| Number | Country | Date |
|---|---|---|
| 8,448 | Germany | Feb. 12, 1880 |